(12) United States Patent
Petrick et al.

(10) Patent No.: US 7,122,802 B2
(45) Date of Patent: Oct. 17, 2006

(54) METHOD AND APPARATUS FOR INCREASING THE DATA ACQUISITION RATE IN A DIGITAL DETECTOR

(75) Inventors: Scott W. Petrick, Sussex, WI (US); Scott A. Bielski, Sussex, WI (US); Alan D. Blomeyer, Milwaukee, WI (US); Francois S. Nicolas, Gif sur Yvette (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 993 days.

(21) Appl. No.: 10/126,162

(22) Filed: Apr. 19, 2002

(65) Prior Publication Data

US 2003/0197800 A1    Oct. 23, 2003

(51) Int. Cl.
*H01L 27/00* (2006.01)
(52) U.S. Cl. .............................. 250/370.09; 250/37.08; 250/370.01; 378/115; 378/117; 382/131; 382/132
(58) Field of Classification Search ........... 250/370.09, 250/370.08, 370.01; 382/132, 131; 378/115, 378/117
See application file for complete search history.

(56) References Cited

U.S. PATENT DOCUMENTS

| | | | | |
|---|---|---|---|---|
| 4,996,413 A | * | 2/1991 | McDaniel et al. ....... | 250/208.1 |
| 5,352,884 A | * | 10/1994 | Petrick et al. ........... | 250/208.1 |
| 5,668,375 A | * | 9/1997 | Petrick et al. ......... | 250/370.09 |
| 5,920,070 A | * | 7/1999 | Petrick et al. ......... | 250/370.09 |
| 6,798,864 B1 | * | 9/2004 | Petrick et al. ............. | 378/98.8 |
| 2005/0133687 A1 | * | 6/2005 | Bock ....................... | 250/208.1 |

FOREIGN PATENT DOCUMENTS

EP            0833505            4/1998

* cited by examiner

*Primary Examiner*—Otilia Gabor
*Assistant Examiner*—Christine Sung
(74) *Attorney, Agent, or Firm*—Fletcher Yoder

(57) ABSTRACT

A technique is provided for improving performance of a digital detector system, such as in a digital X-ray system. Improved frame rates and enhanced resolutions are achieved by selecting a field of view of interest and processing pixel information only for the selected field of view. Data from a series of rows of the detector are simultaneously processed by restoring charge to pixels of a row, while digitizing signals from a previously recharged row, and transmitting digital signals for a third row for which the signals were previously digitized. Scrubbing of rows outside the selected field of view may be performed as signals are detected and processes for rows within the selected field of view.

72 Claims, 12 Drawing Sheets

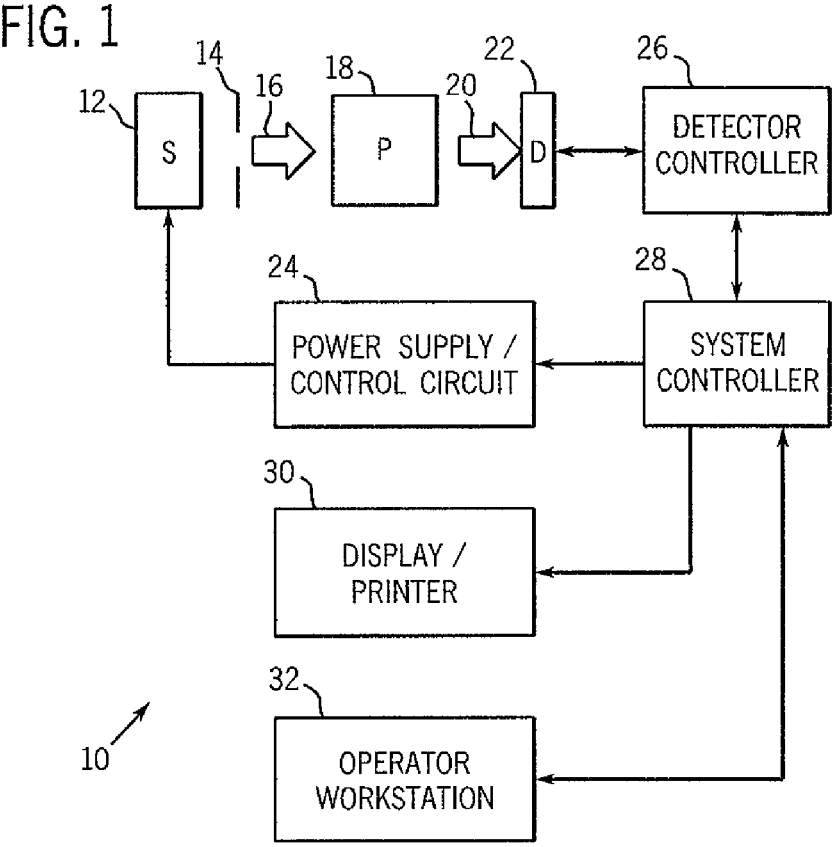
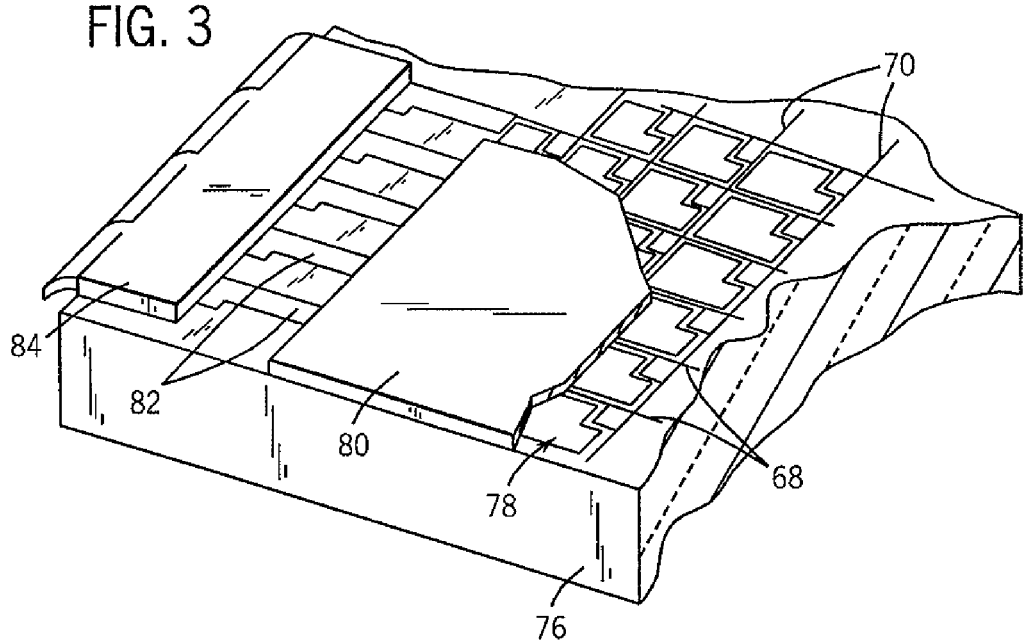

METHOD AND APPARATUS FOR INCREASING THE DATA ACQUISITION RATE IN A DIGITAL DETECTOR

FIELD OF THE INVENTION

The present invention relates generally to imaging systems, such as radiographic systems, and more particularly, to digital detectors used in such systems. Even more particularly, the present invention relates to an apparatus and method for reducing time involved in reading a solid state X-ray detector.

BACKGROUND OF THE INVENTION

Digital imaging systems are becoming increasingly widespread for producing digital data which can be reconstructed into useful radiographic images. In one application of a digital imaging system, radiation from a source is directed toward a subject, typically a patient in a medical diagnostic application, and a portion of the radiation passes through the subject and impacts a detector. The surface of the detector converts the radiation to light photons, which are sensed.

The detector is divided into an array of discrete picture elements or pixels, and encodes output signals based upon the quantity or intensity of the radiation impacting each pixel region. Because the radiation intensity is altered as the radiation passes through the subject, the images reconstructed based upon the output signals may provide a projection of tissues and other features similar to those available through conventional photographic film techniques.

In available digital detectors, the detector surface is divided into an array of picture elements or pixels, with rows and columns of pixels being organized adjacent to one another to form the overall image area. When the detector is exposed to radiation, photons impact a scintillator coextensive with the image area. A series of detector elements are formed at row and column crossing points, each crossing point corresponding to a pixel making up the image matrix. In one type of detector, each element consists of a photodiode and a thin film transistor. The transistors and photodiodes are typically constructed of amorphous silicon, over which cesium iodide is deposited. The cesium iodide absorbs the X-rays and converts them to light, which is then detected by the photodiodes. As can be appreciated by those skilled in the art, the photodiode acts as a capacitor, where the photodiode is generally charged to some known voltage. Light that is emitted in proportion to the X-ray flux then partially discharges the photodiode. Once the exposure is completed, charge on the photodiode is restored to the initial charge. The amount of charge required to restore the initial voltage on the photodiode is then measured which becomes a measure of the X-ray radiation impacting the pixel during the length of the exposure.

In a detector of the type described above, the cathode of each photodiode is connected to the source of a transistor, and the anodes of all diodes are connected to a negative bias voltage. Further, the gates of the transistors in a row are connected together and a row electrode is connected to scanning electronics. The drains of the transistors in each column are connected together and each column electrode is connected to additional readout electronics. Sequential scanning of the rows and simultaneous read out of the signals present at the column electrode permits the system to acquire the entire array or matrix of signals for subsequent signal processing and display. Thus, the detector is read or "scrubbed" on a row-by-row basis as controlled by the transistor associated with each photodiode. It should be noted that reading of the detector refers to recharging of the photodiodes and collection of data when the image produced by the detector contains valuable data, mainly images that contain exposure or offset data, whereas "scrubbing" refers to similar recharging even though the data is not important and can be discarded or not collected at all. Scrubbing, therefore is executed to restore the charge on the photodiode. More importantly, scrubbing is performed to maintain a proper bias on the diodes during idle periods or to reduce the effects of lag, which is an incomplete charge restoration of the photodiodes. Thus, scrubbing is typically performed to restore and maintain the charge of the photodiode, in addition to preventing a continuous DC voltage bias on the amorphous silicon transistors.

The detector is typically read or scrubbed according to its array structure, that is, on a row-by-row basis. As mentioned above, the reading or scrubbing of the detector is controlled by field effect transistors (FETs) associated with each photodiode. The FET allows the minimization of the number of electrical contacts that would need to made to the detector. Thus, the FETs reduce the number of required contacts to no more than the number of pixels along the perimeter of the array. Further, an entire row of an array may be controlled simultaneously when the scan line attached to the gates of all the FETs of pixels on that particular row is activated. It should be noted that each of the pixels on the particular row is connected to a separate data line through a FET, which is used by the readout electronics to restore the charge to the photodiodes. Thus, as each row is activated or read-enabled, the charge is restored for each pixel in that row simultaneously by the read out electronics over the individual data line for each column. Thus, each data line has a dedicated read out channel associated with it.

In use, the signals generated at the pixel locations of the detector are sampled and digitized. The digital values are transmitted to processing circuitry where they are filtered, scaled, and further processed to produce the image data set. The data set may then be used to reconstruct the resulting image, to display the image, such as on a computer monitor, to transfer the image to conventional photographic film, and so forth. In the medical imaging field, such images are used by attending physicians and radiologists in evaluating the physical conditions of a patient and diagnosing disease and trauma.

Large area solid-state detector arrays, such as those described above, provide solutions for digital imaging applications such as medical imaging, digital reproduction and non-destructive testing. While such detectors provide excellent image data, further improvement is needed. For instance, a detector having a small pixel size providing high spatial resolution comes at the cost of acquisition frame rate. Furthermore, for a given pixel size, a larger detector is generally more expensive due to the cost of the required support electronics, and will not support frame rates as fast as a smaller detector with the same bandwidth. Many times, when a specific application is targeted, detector design tradeoffs are made to optimize the detector's performance in regards to that application. One result of this is that larger detectors with small pixels typically do not have the bandwidth to support higher frame rates.

There is a need, therefore, for a technique designed to increase the acquisition frame rate without affecting other variables that reduce image quality.

SUMMARY OF THE INVENTION

The present invention features a digital detector design that addresses such needs. One aspect of the technique provides a method for acquiring signals from discrete pixels in a detector. The detector includes a matrix of rows and columns of pixels, whereby each pixel is configured to generate a signal based upon the radiation received from a radiation source and at improved frame rates.

Another aspect of the technique relates to an imaging system including a source of radiation, a control circuit to regulate the source of radiation, and a detector for receiving radiation from the source and for generating signals therefrom. The detector has an array of pixels, forming rows and columns coupled to a plurality of scan lines, each scan line being coupled to a plurality of rows of pixels. The detector is configured to process the exposure in a reduced field of view.

Yet another aspect of the technique relates to a detector comprising an array of pixels in rows and columns, configured to generate signals based upon radiation impacting the detector. The detector also has a plurality of scan lines, wherein each scan line is coupled to a plurality of rows of pixels. Additionally, the pixels of the array are coupled to a series of data lines, so that when the pixels are scanned, the data generated by the scan are transmitted via the data lines to a data acquisition subsystem.

BRIEF DESCRIPTION OF THE DRAWINGS

FIG. 1 is a diagrammatical overview of a digital X-ray imaging system in which the present technique may be utilized;

FIG. 3 is a partial sectional view illustrating an exemplary detector structure for producing the image data;

DETAILED DESCRIPTION OF THE INVENTION

Figure 2:
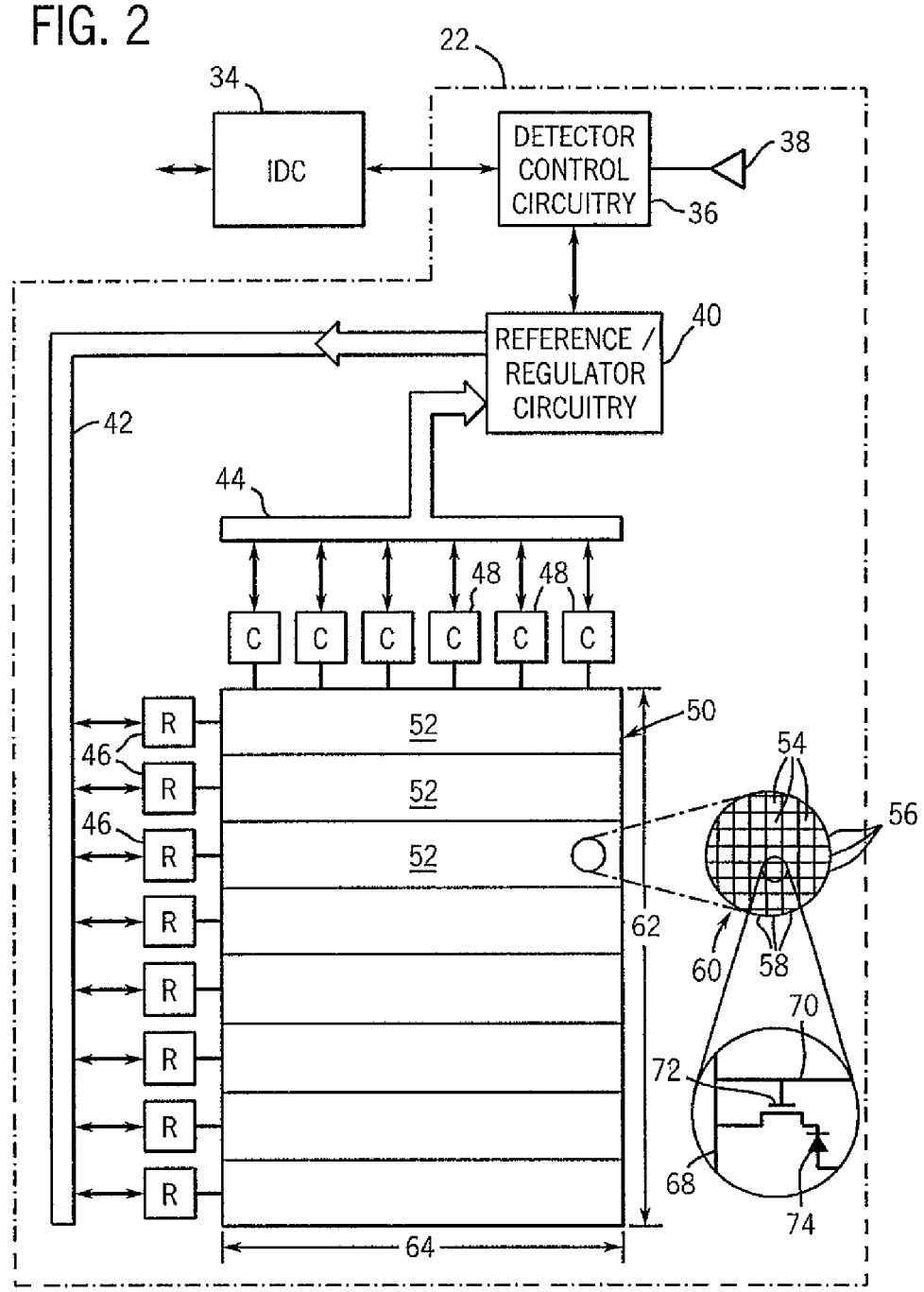
FIG. 2 is a diagrammatical representation of the functional circuitry in a detector of the system of FIG. 1 to produce image data for reconstruction.

FIG. 1 illustrates diagrammatically an imaging system 10 for acquiring and processing discrete pixel image data. In the illustrated embodiment, system 10 is a digital X-ray system designed both to acquire original image data and to process the image data for display in accordance with the present technique. In the embodiment illustrated in FIG. 1, imaging system 10 includes a source of X-ray radiation 12 positioned adjacent to a collimator 14. Collimator 14 permits a stream of radiation 16 to pass into a region in which a subject, such as a human patient 18 is positioned. A portion of the radiation 20 passes through or around the subject and impacts a digital X-ray detector, represented generally at reference numeral 22. As described more fully below, detector 22 converts the X-ray photons received on its surface to lower energy photons, and subsequently to electric signals, which are acquired and processed to reconstruct an image of the features within the subject.

Source 12 is controlled by a power supply/control circuit 24 which furnishes both power and control signals for examination sequences. Moreover, detector 22 is coupled to a detector controller 26 which commands acquisition of the signals generated in the detector 22. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

FIG. 2 is a diagrammatical representation of functional components of digital detector 22. FIG. 2 also represents an imaging detector controller or IDC 34 which will typically be configured within detector controller 26. IDC 34 includes a CPU or digital signal processor, as well as memory circuits for commanding acquisition of sensed signals from the detector. IDC 34 is coupled via two-way fiberoptic conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column electronics used to acquire image data during data acquisition phases of operation of the system. Circuitry 36 therefore transmits power and control signals to reference/regulator circuitry 40, and receives digital image pixel data from circuitry 40.

In a present embodiment, detector 22 consists of a scintillator that converts X-ray photons received on the detector surface during examinations to lower energy (light) photons. An array of photodetectors then converts the light photons to electrical signals which are representative of the number of photons or the intensity of radiation impacting individual pixel regions of the detector surface. Readout electronics convert the resulting analog signals to digital values that can be processed, stored, and displayed, such as in a display 30 or a workstation 32 following reconstruction of the image. In a present form, the array of photodetectors is formed of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics as described below. The drains of the transistors in a column are connected together and the electrode of each column is connected to an individual channel of the readout electronics.

In the particular embodiment illustrated in FIG. 2, by way of example, a row bus 42 includes a plurality of conductors for enabling readout from various rows of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector. In the present technique, image acquisition rate is increased by employing a partial readout of the detector 22.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each column driver 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64. Again, as described below, the present technique allows an enhanced number of pixels to be read out via the row drivers and column readout electronics.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode 74 may be accessed via readout electronics 48, and converted to digital signals for subsequent processing and image reconstruction. Thus, an entire row of pixels in the array is controlled simultaneously when the scan line attached to the gates of all the transistors of pixels on that row is activated. Consequently, each of the pixels in that particular row is connected to a data line, through a switch, which is used by the readout electronics to restore the charge to the photodiode 74.

It should be noted that as the charge is restored to all the pixels in one row simultaneously by each of the associated dedicated readout channels, the readout electronics is converting the measurements from the previous row from an analog voltage to a digital value. Furthermore, the readout electronics are transferring the digital values from 2 rows previous to the acquisition subsystem, which will perform some processing prior to displaying a diagnostic image on a monitor or writing it to film. Thus, the read out electronics are performing three functions simultaneously; measuring or restoring the charge for the pixels in a particular row, converting the data for pixels in the previous row and transferring the converted data for the pixels in a twice previous row.

FIG. 3 generally represents an exemplary physical arrangement of the components illustrated diagrammatically in FIG. 2. As shown in FIG. 3, the detector may include a glass substrate 76 on which the components described below are disposed. Column electrodes 68 and row electrodes 70 are provided on the substrate, and an amorphous silicon flat panel array 78 is defined, including the thin film transistors and photodiodes described above. A scintillator 80 is provided over the amorphous silicon array for receiving radiation during examination sequences as described above. Contact fingers 82 are formed for communicating signals to and from the column and row electrodes, and contact leads 84 are provided for communicating the signals between the contact fingers and external circuitry.

It should be noted that the particular configuration of the detector panel 22, and the subdivision of the panel into rows and columns controlled by row drivers and column read out channels is subject to various alternate configurations. In particular, more or fewer row drivers and column read out channels may be used, and detector panels having various matrix dimensions may thereby be defined. The detector panel 22 may be further subdivided into regions of multiple sections, such as along a vertical or horizontal center line.

It should be further noted that the readout electronics in the detector generally employ a pipeline type architecture. For example, as the charge is restored to all the pixels in a particular row simultaneously by each of the associated dedicated readout channels, the readout electronics convert the measurements from the previous row from an analog signal to a digital signal. Concurrently, the readout electronics transfer the measured digital values from two rows previous to the data acquisition subsystem. The data acquisition subsystem typically performs some processing prior to displaying a diagnostic image on a display. Thus, the readout electronics in the present technique perform three functions simultaneously.

Figure 4:
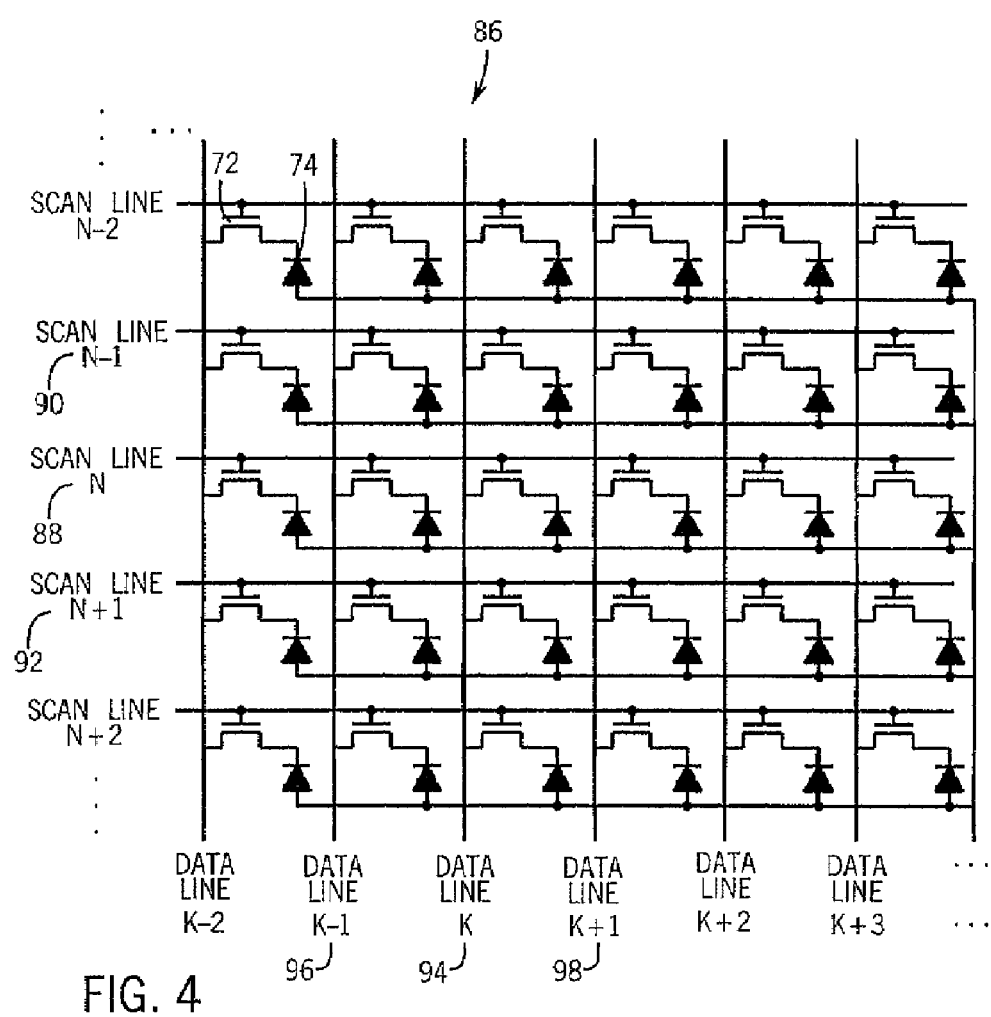
FIG. 4 is a circuit schematic illustrating rows and columns of pixels in an exemplary detector.

FIG. 4 illustrates an array of pixels 86 located on an exemplary detector having a plurality of column lines and row lines. As illustrated by the array of pixels 86, each pixel comprises the transistor 72 and the photodiode 74. It should be noted that the array is made up of a plurality of scan lines 88, 90, 92 and a plurality of data lines 94, 96 and 98. The scan lines 88, 90, 92 represent rows of pixels scanned during the imaging process. Similarly, the data lines 94, 96 and 98 represent the columns of pixels through which signal information representing image data is transmitted to the read out electronics. As can be appreciated by those skilled in the art, the scan lines typically control the recharge of the photodiode and while the read out electronics measure the amount of charge displaced. The read out electronics then typically transmit the data from each row of pixels to the data acquisition system.

As illustrated, scan line 88 (denoted N in FIG. 4) is connected to each one of the pixels in that specific row. Additionally, scan line 88 is capacitively coupled to each of one of the data lines by virtue of both the scan/data line crossover and the capacitance between the gate and the drain of the pixel FET. For example, scan line 88 is capacitively coupled to data line 94 (denoted K in FIG. 4) and data line 98 (K+1). Similarly, each one of the data lines is capacitively coupled to each one of the scan lines. Thus, as illustrated for the array of pixels 86, scan line 88 (N), scan line 90 (N−1), and scan line 92 (N+1) are capacitively coupled to data line 94 (K), data line 96 (K−1), and data line 98 (K+1) and so on. It should be understood that each data line is typically connected to one specific column of pixels and each scan line is connected to one specific row of pixels. Additionally, although in the present embodiment of FIG. 4, 30 pixels are illustrated, it should be noted that additional pixels may, of course, be incorporated in the pixel array.

Figure 5:
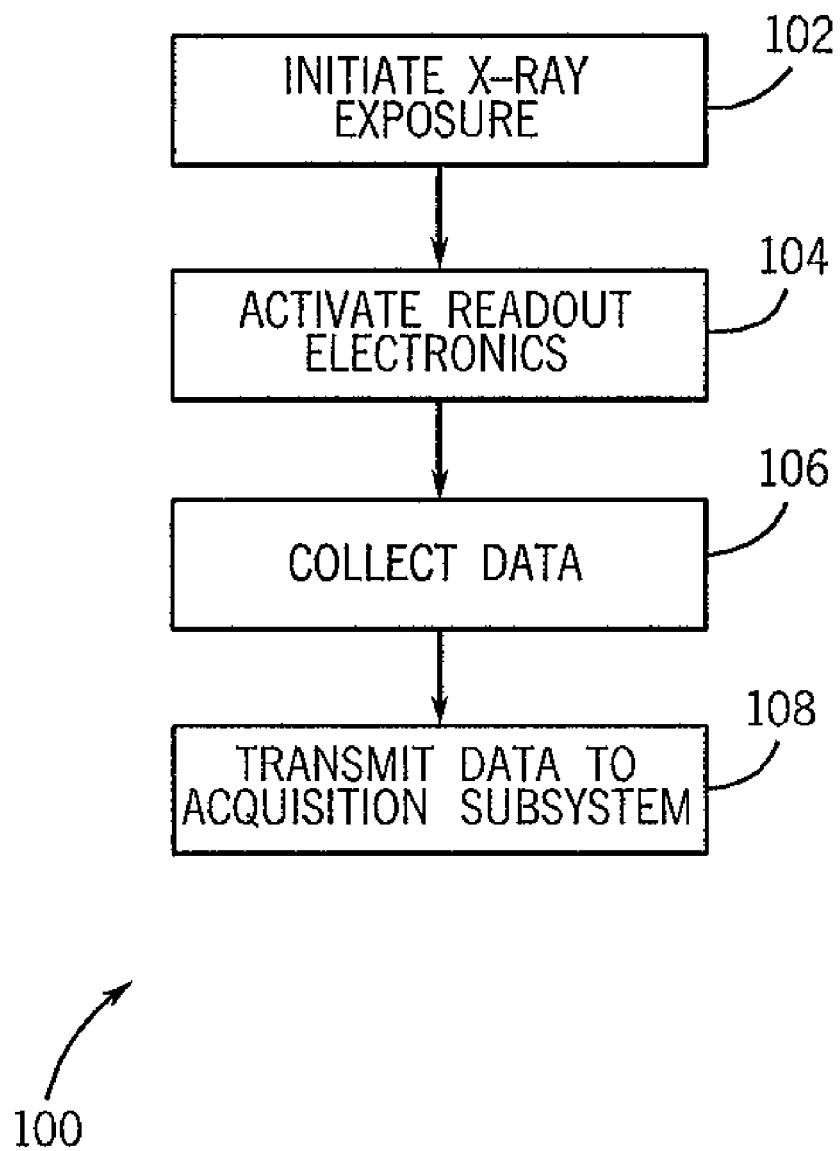
FIG. 5 is a flowchart representing the method of operating an exemplary imaging system for providing image data.

Turning to FIG. 5, a flowchart is represented illustrating a method 100 for operating an imaging system of the type described above. Initially, an X-ray exposure is initiated by an operator, as represented by step 102. Once an X-ray exposure is completed, the readout electronics within the detector 22 are activated, as indicated by step 104. As mentioned above, an exposure is taken of a patient, whereby X-rays are transmitted through the patient and received by the detector. The array of pixels 86 typically measures the intensity of the X-rays received by the detector 22, via the photodiode provided within each individual pixel. The readout electronics typically collect data from the pixels utilizing circuitry associated with each of the data lines, as indicated by step 106. Once the data are collected for a particular row of pixels, the data are transmitted to a data acquisition subsystem as indicated by step 108. While data from one specific row of pixels is transmitted to the data acquisition subsystem, signal from the next row of pixels is being converted from analog to digital. Furthermore, pixels from two rows beyond the row being transmitted are being scanned and read. It should be understood that this process continues until the detector 22, and more particularly all the pixels, are read out. Subsequently, the collected data are processed and ultimately used to reconstruct an image of the exposure area.

Figure 6:
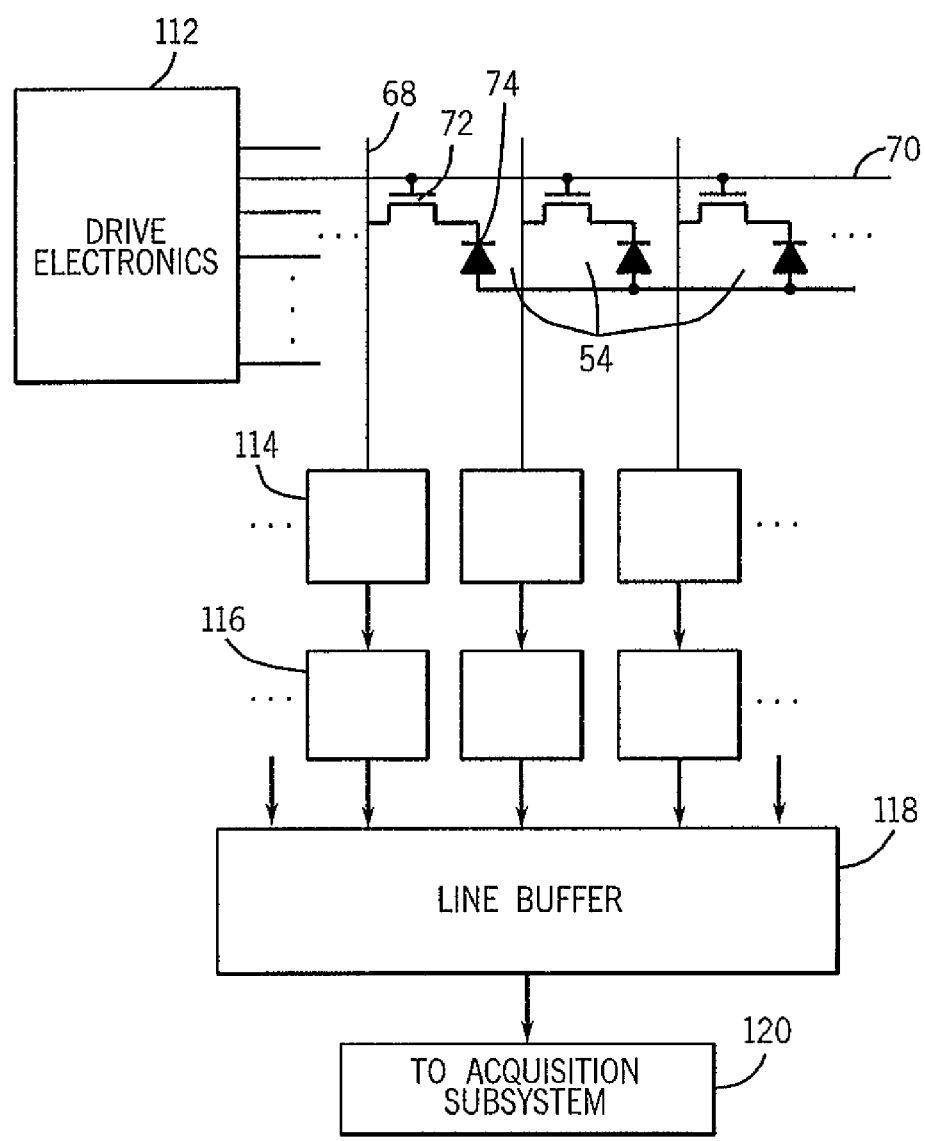
FIG. 6 is a block diagram of the representing the connectivity of an exemplary detector.

FIG. 6 illustrates a block diagram of certain functional circuitry of a detector and the corresponding readout electronics utilized in an exemplary imaging system. Particularly, FIG. 6 illustrates pixels 54 each comprising a transistor 72 and photodiode 74. A scan line 70 and a data line 68 are also illustrated connected to the respective FET 72 of each of the pixels 54. It should be further noted that the scan line 70 is connected to drive electronics 112. It should be noted that each consecutive row of pixels is similarly connected to the drive electronics 112 by a scan line. On the other hand, each one of the data lines 68 is connected to a corresponding recharge and measurement subcircuit 114. It should be noted that each subcircuit 114 restores the charge to each one of the pixels 54. Further each subcircuit 114 also measures the discharge experienced by the diodes as a result of exposure to radiation. Additionally, each subcircuit 114 is connected to a convert subcircuit 116. The convert subcircuits 116 are configured to convert analog signals received from the pixels 54 to digital signals. It should be understood that each one of the restore/measure subcircuits 114, are connected to specific convert subcircuit 116. The signals from each convert subcircuits 116 are then transmitted to a line buffer 118, which comprises part of an output subcircuit, which is not represented in its entirety. Subsequently, the line buffer outputs digital data to the data acquisition subsystem 120.

Thus, to summarize, as the drive electronics 112 scan each row of pixels, the column or data lines recharge the pixels and measure the discharge of the associated photodiodes. The measured data is then transmitted to a convert subcircuit for converting the analog signals to digital signals or data. Next, the convert subcircuits transmit the digital signals for each pixel to the line buffer, which collects the data and outputs the collected data for the array of pixels to the data acquisition subsystem 120.

Figure 7:
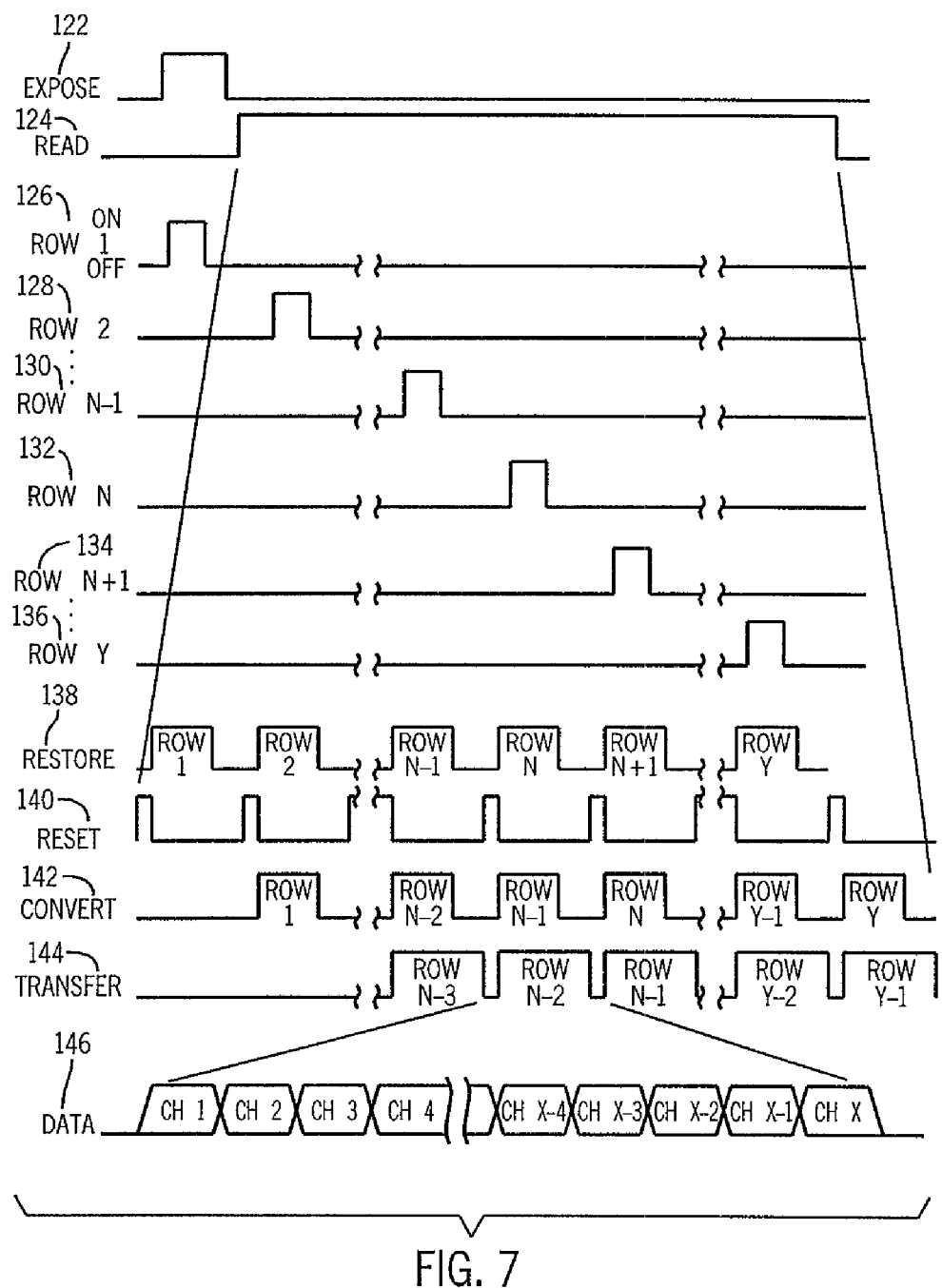
FIG. 7 is a timing diagram illustrating a readout operation of an exemplary detector.

Turning to FIG. 7, a timing diagram of a normal readout of a detector consisting of "X" rows and "Y" columns is illustrated. Particularly, axis 122 and 124 illustrate the functions of the imaging system 10. Axis 122 represents a pulse pattern for an imaging exposure of a region of interest of a patient, whereby image signals are generated by the detector. At the time of the image exposure, a signal is provided as illustrated by axis 122, wherein the detector reads out the signals as indicated by axis 124. Thus, when the detector reads out a particular detector row, as indicated by axes 126 to 136, the rows are enabled or activated in sequential order. Particularly, axis 126 illustrates a row 1 as it is activated when the readout of the detector is initiated. It should be noted that axis 138 illustrates pulses for a restore function provided by the detector readout electronics. Specifically, axis 138 represents operation of the restore subcircuit 114 as represented in FIG. 6. Further, axis 138 illustrates a row-by-row restoration of the charge depleted when the pixels are discharged. For example, row 1 is illustrated at a high level along axis 138 when the pixels in row 1 are recharged. Subsequently, following row 1, row 2 are recharged and so on.

Axis 140 illustrates pulses of a reset function provided by the detector readout electronics. Particularly, the reset signal prepares for the measurement of the rows of pixels. Thus, axis 140 illustrates the reset of the restore subcircuit 114 prior to the restoration of the charge in each pixel of the row that is about to be activated. Axis 142 represents pulses of the convert function of the readout electronics. Particularly, the conversion process as illustrated always lags the restoration process by one row or line. Furthermore, it is not until the third row as represented in the present embodiment that the data from the first row, now in digital form after being converted, can be transferred to the acquisition subsystem. The transfer function for several rows is illustrated by axis 144. Axis 146 illustrates the transfer of data from one line.

Thus, in the example, an X-ray exposure causes the photodiodes to partially discharge as described above. At the conclusion of the exposure, the process of reading out the detector is performed by activating the FET for each pixel in a row, such as beginning with row 1. As each row is read, as for axis 126 as illustrated, the readout electronics restore the charge on each photodiode to reach the desired voltage. The discharge is measured by the readout electronics based upon the charge needed to restore each photodiode to its original charge. For example, as row 2, as represented by axis 138 the charge is restored, the analog signal measured for row 1 is converted as represented along axis 142. Next, as row N−1 (see axis 130) is restored to the original charge as represented by axis 138, row N−2 signals are converted to digital signals (see axis 142), and row N−3 signals, now in digital form, are transferred to a data acquisition system (see axis 144). Particularly, row N−2 is illustrated in FIG. 7 as transmitting data signals from channel 1 through channel "X" as illustrated by axis 146.

Figure 8:
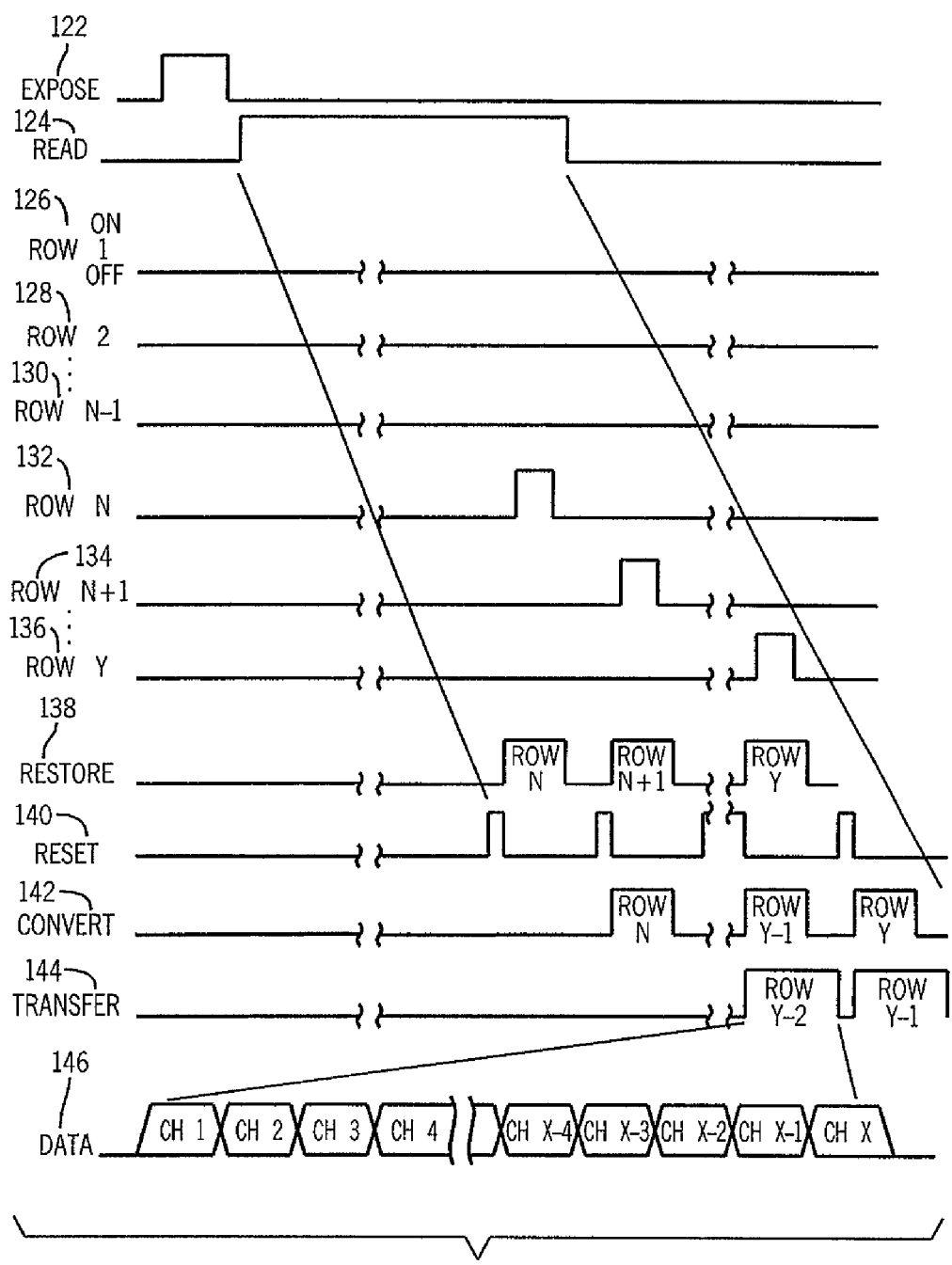
FIG. 8 is a timing diagram illustrating a readout operation utilized by the present technique.

FIG. 8 illustrates a timing diagram for an abbreviated read out of the detectors starting at row N without scrubbing unread rows and transferring all "X" columns of data. Particularly, FIG. 8 shows the readout of the detector 22 of specific rows N through Y, corresponding to axes 132 134, and 136 respectively. It should be noted that row 1, row 2, and row N−1 are not active in the scheme illustrated in FIG.

8. Thus, as described above for row 1, row N is read out as its charge is restored, as illustrated by restore axis 138 and axis 132. After a short time delay row N+1 is restored to its original charge. Subsequently, pixels of row Y are recharged to their original charge as indicated by axis 136 and restore axis 138. It should be further noted that a reset signal is applied to the restore/measure subcircuit 114 before actual recharge of the photodiodes for each row occurs as illustrated by axis 140. In the present embodiment, the conversion of the analog signals to digital signals is accomplished for each row as illustrated by the convert axis 142. Specifically, the signals from row N are converted to digital signals as row N+1 is being recharged. Similarly, row Y−1 signals are being converted to digital signals as photodiodes of row Y are recharged. Further, row Y signals are similarly converted to digital signals as illustrated by line 142.

Next, the digital signals are transferred to the data acquisition system as represented for a single row by axis 146. In the illustrated embodiment, signals for row Y−2 are transferred to the data channels at the same time signals from row Y−1 are being converted from analog to digital form. It should also be understood that at the same time pixels of row Y are being recharged. Similarly, as signals from row Y−1 are being transferred to the data channels, signals from row Y are being converted from analog to digital form. Thus, as can be seen by the illustration in FIG. 8 each function of restoring, converting and transferring the signals produced by the exposure occurs in sequence for individual rows, and partially overlapped in time for the series of rows.

Figure 9:
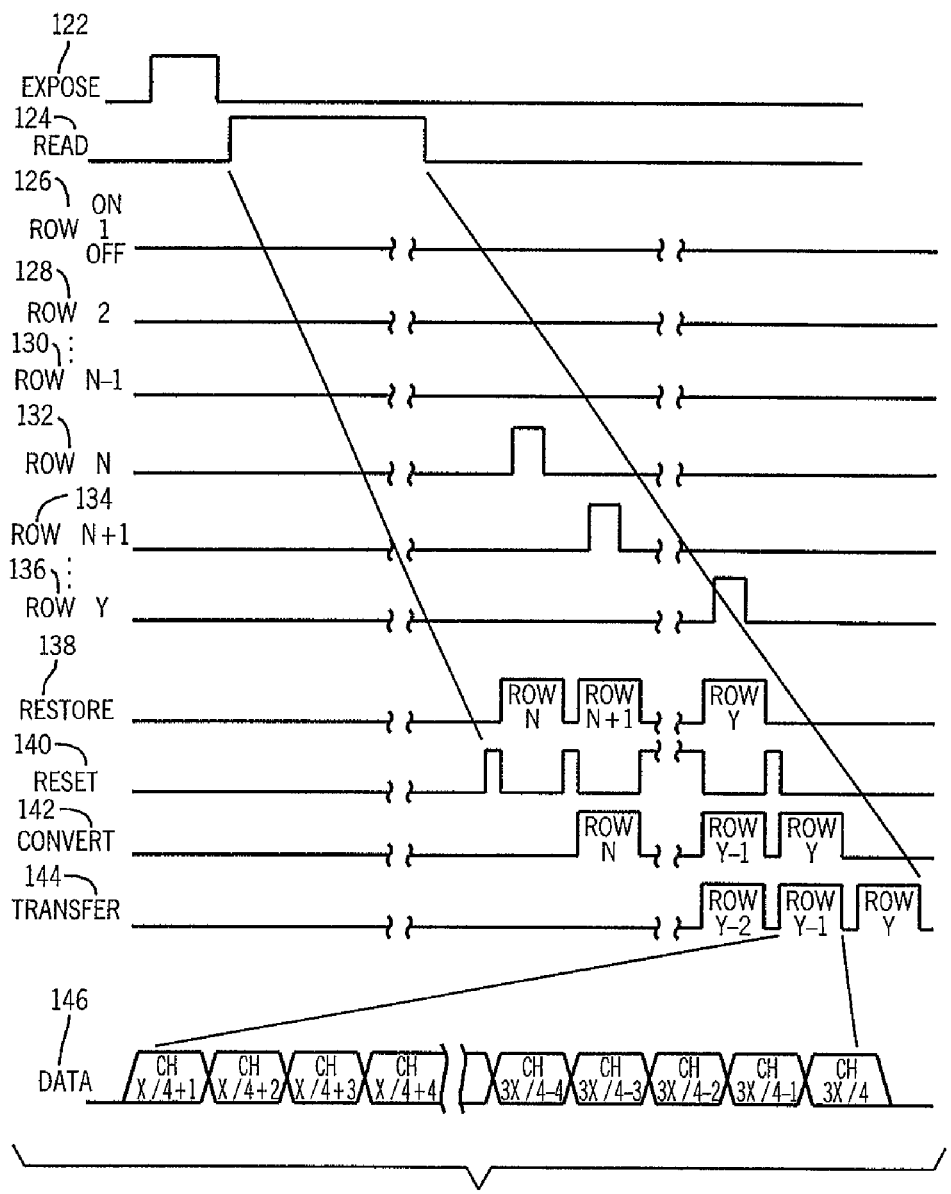
FIG. 9 is a timing diagram illustrating an alternative readout operation as illustrated in FIG. 8.

FIG. 9 illustrates a timing diagram showing an abbreviated read out of a detector starting at row N without scrubbing of unread rows and transferring "X/2" columns of data. FIG. 9 illustrates series of axes 122–146. It should be noted that the read out of the detector begins in this implementation at row N as illustrated on axis 132. As also illustrated, after row N is read out, row N+1 and row Y are readout as illustrated by axes 134 and 136, respectively. As row N is read out, the photodiodes of the pixels comprising row N are recharged as shown by axis 138. Subsequently, after a short time delay, row N+1 is recharged. The reset of the restore/measure subcircuit 114 prior to the activation of each individual row is illustrated by line 140. Subsequently, after a short period of time, pixels of row Y are restored to their original charge. Further, as the pixels of row N+1 are being recharged, the signals received from row N are converted from analog signals to digital signals as illustrated by axis 142. Next, the pixels in row Y are recharged as the data signals from row Y−1 are converted from analog signals to digital signals. Similarly, signals from row Y are converted from analog signals to digital signals after a short time delay. Thus, as the signals from row Y−1 are being converted from analog to digital form, and pixels of row Y are recharged, the signals from row Y−2 are transferred from the detector to the data acquisition system. Specifically, the signals are sent as illustrated by axis 146. Subsequently, as signals from row Y are being converted to digital signals, signals from row Y−1 are transferred to the data channels. The present illustration depicts signals transferred from row Y, after similar transfer of signals from row Y−1 as illustrated by axis 144.

Figure 10:
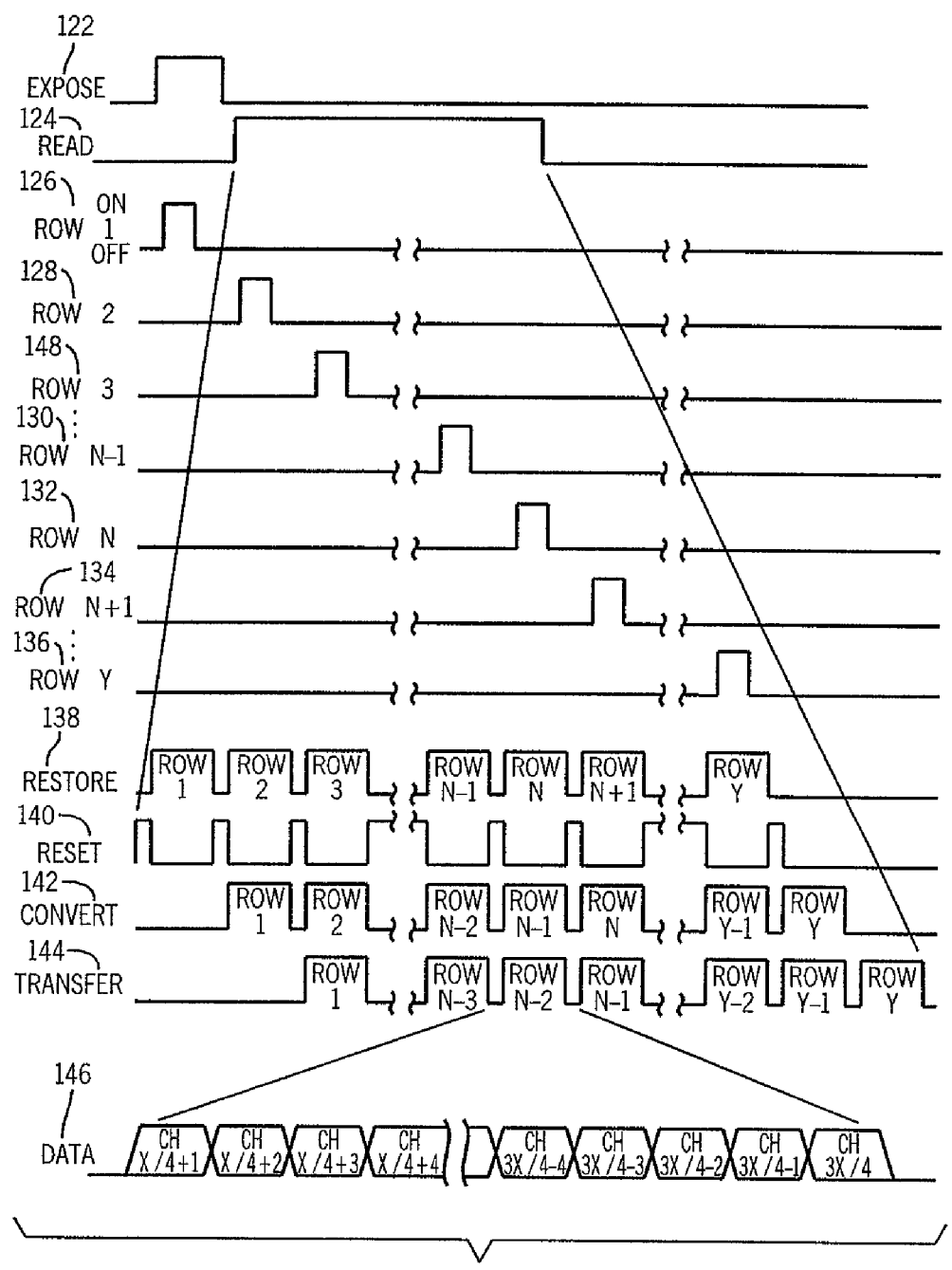
FIG. 10 is a timing diagram illustrating a readout operation of a reduced field of view in an exemplary detector.

FIG. 10 illustrates a timing diagram showing a reduced field of view consisting of Y rows and "X/2" columns. In this illustration, row 1 through row Y are activated, as illustrated by axes 126–136. Axes 138–146 illustrate the restoring, converting, and transferring functions for the detector. Thus, it should be noted that the read out of the detector as illustrated by axis 124 is shown by axes 126–144. In the present diagram the read out of rows 1 through Y is illustrated. Similarly to the procedure discussed above, axes 122 and 124 illustrate the exposure and readout functions of the imaging system 10. Axis 122 represents the imaging system exposing a region of interest of a patient, whereby image signals are generated by the detector. When a patient is exposed to radiation, signals are provided as described above, and the detector reads out the signals as indicated by axis 124. Thus, as the rows of the detector are read, the rows are activated in sequential order as indicated by axes 126 to 136. Particularly, axis 126 illustrates row 1 as it is activated when the readout of the detector is initiated. It should be noted that, as before, axis 138 refers to a restore function provided by the detector readout electronics. Axis 138 represents operations of the restore subcircuit 114 as represented in FIG. 6. Further, axis 138 illustrates a row-by-row restoration of the charge depleted when the pixels of the detector are discharged by the exposure. For example, row 1 is illustrated at a high along axis 138 when the pixels in row 1 are recharged. After a certain amount of time has elapsed, row 2 is recharged, and so on. Next, axis 140 illustrates a reset axis for a reset function provided by the detector readout electronics. The reset signal prepares for the measurement of the rows of pixels. Thus, axis 140 illustrates the reset of the restore/measure subcircuit 114 for each row prior to the restoration function of the charge in each pixel. Axis 142 represents the convert function of the readout electronics. The conversion process as illustrated always lags the restoration process by the one row or line. Furthermore, it is not until the third row, as represented in the present embodiment, that the data from the first row, now in digital form after being converted during restoration of the second row, can be transferred to the acquisition subsystem. The transfer function is illustrated by axis 144.

Thus, in the example, an X-ray exposure causes the photodiodes to partially discharge as describe earlier. At the conclusion of the exposure, the process of reading out the detector is performed by activating the FET for each of the pixels of interest. As represented by FIG. 10, axis 126 is activated as illustrated. Simultaneously, the readout electronics restore the charge of each photodiode to the desired voltage, and the discharge is measured by the readout electronics. For example, as charges of pixels of row 2 as represented by axis 138 are restored, the analog signals measured for row 1 are converted to digital form as represented in axis 142. Next, as charges of pixels of row N−1 are restored as represented by axis 138, row N−2 signals are converted to digital signals, and row N−3 digital signals are transferred to a data acquisition system. Particularly, signals of row N−2 are illustrated in FIG. 10 as being transmitted from channel X/4+1 through channel 3X/4, as illustrated by axis 146.

Figure 11:
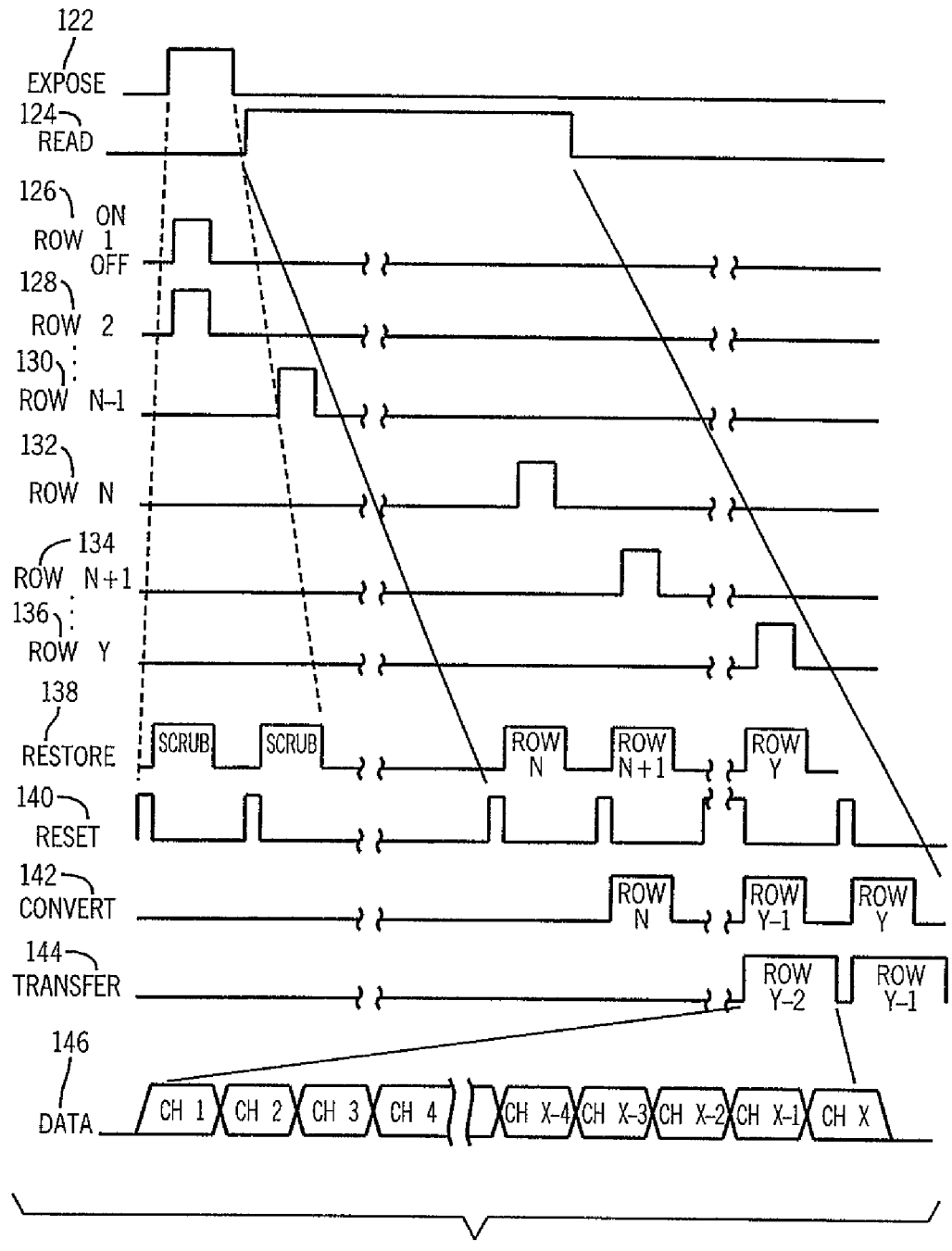
FIG. 11 is timing diagram illustrating the present technique of initiating a readout operation and scrubbing operation simultaneously.

FIG. 11 illustrates a timing diagram representing an abbreviated readout of the detector starting at a row N with scrubbing of unread rows in parallel and transferring all "X" columns of data. FIG. 11 shows the read out of the detector 22 by specific rows N−1, N, N+1 and Y with respect to axes 130, 132, 134 and 136. It should be noted that row 1 and row 2 are active in this implementation. Specifically, during the time that the detector is being exposed, pixels of rows 1 and 2 are scrubbed. Thus, the charge for pixels of these rows is restored, however data is not measured and collected. It should be noted that a short time delay is provided before each restore function, as illustrated by axis 140. Thus, after a short time delay charges of pixels of row N+1 represented by axis 134 are restored to their original charge. Subsequently, pixels of row Y are recharged as indicated by axis 136 and restore axis 138. It should be further noted that a reset signal is applied to the restore subcircuit before actual recharge of the photodiodes in each row occurs as illustrated by axis 140. In the present embodiment, the conversion of the analog signals to digital signals is accomplished for each row as illustrated by the convert axis 142. Specifically, the signals from row N are converted to digital signals as row N+1 is being recharged. Similarly, row Y−1 signals are converted to digital signals as row Y photodiodes are recharged. Further, row Y signals are converted to digital signals as illustrated by line 142.

As mentioned previously, the converted digital signals are transferred to the data acquisition system as represented by axis 146. In this implementation, data for row Y−2 are transferred to the detector controller 26 at the same time as signals of row Y−1 are being converted from analog to digital form. It should also be understood that, concurrently, row Y pixels are being recharged to their original charge. Similarly, as data for row Y−1 are being transferred to the detector controller 26, row Y signals being converted from analog to digital form. Thus, as can be seen by the illustration in FIG. 11, each function of restoring, converting and transferring the signals produced by the exposure of the X-ray beam occurs sequentially for each row, and overlapped in time for the series of rows read from the detector.

Figure 12:
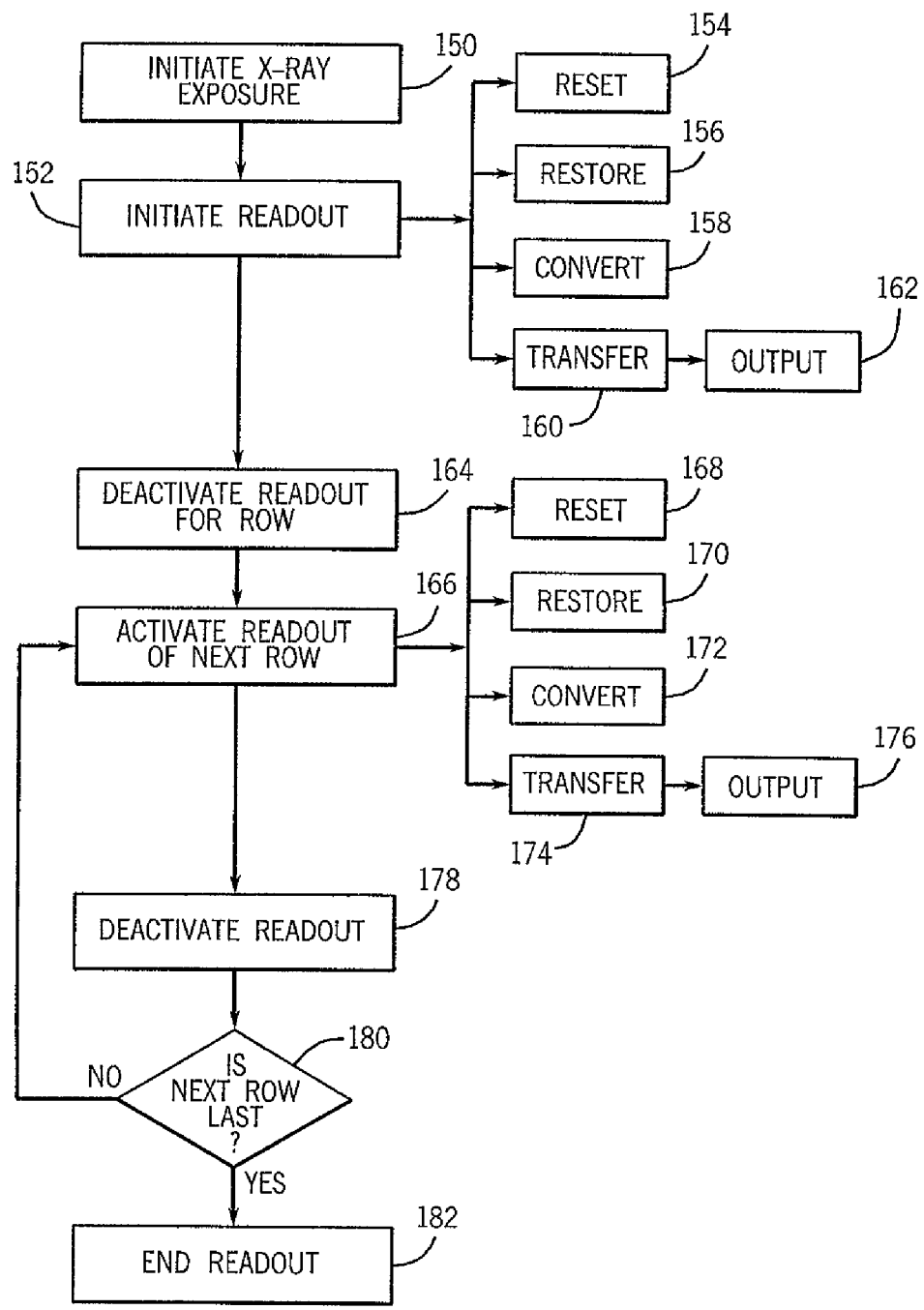
FIG. 12 is flowchart illustrating exemplary steps utilized in performing the present technique.

FIG. 12 is a flow chart representing the process of the present technique. As indicated by step 150, an initial X-ray exposure is taken of a subject of interest. As the exposure is taken, the detector 22 receives a portion of the radiation, following which the read out of the detector is initiated as indicated by step 152. It should be noted that the read out of the detector is initiated by the control system. The read out of the detector comprises reset of the restore subcircuit prior to readout of each row as shown by step 154, and restoring the charge on each photodiode of the pixels as indicated by step 156. Further, the analog signals measured are converted to digital signals as illustrated by step 158. The read out of the detector provides the transfer of the digital signals from the detector electronics to the data acquisition subsystem as indicated by step 160. Once restoration of that specific row is accomplished, the read out for that row is deactivated as illustrated by step 164.

Next, the read out of the subsequent row is activated as shown by step 166. Similar to the previous row, read out of the next row of pixels is performed by initiating the reset, restore, convert, and transfer functions, producing an output is indicated by steps 168–176. Again, once that specific row is readout, the row is subsequently deactivated as illustrated by step 178. Next, the system generally checks whether the next row is the last row to be read as indicated by step 180. If the row just read out was the last row, then the read out of the detector is ended as indicated by step 182. Otherwise, the read out of the next row is activated as illustrated by step 166.

Figure 13:
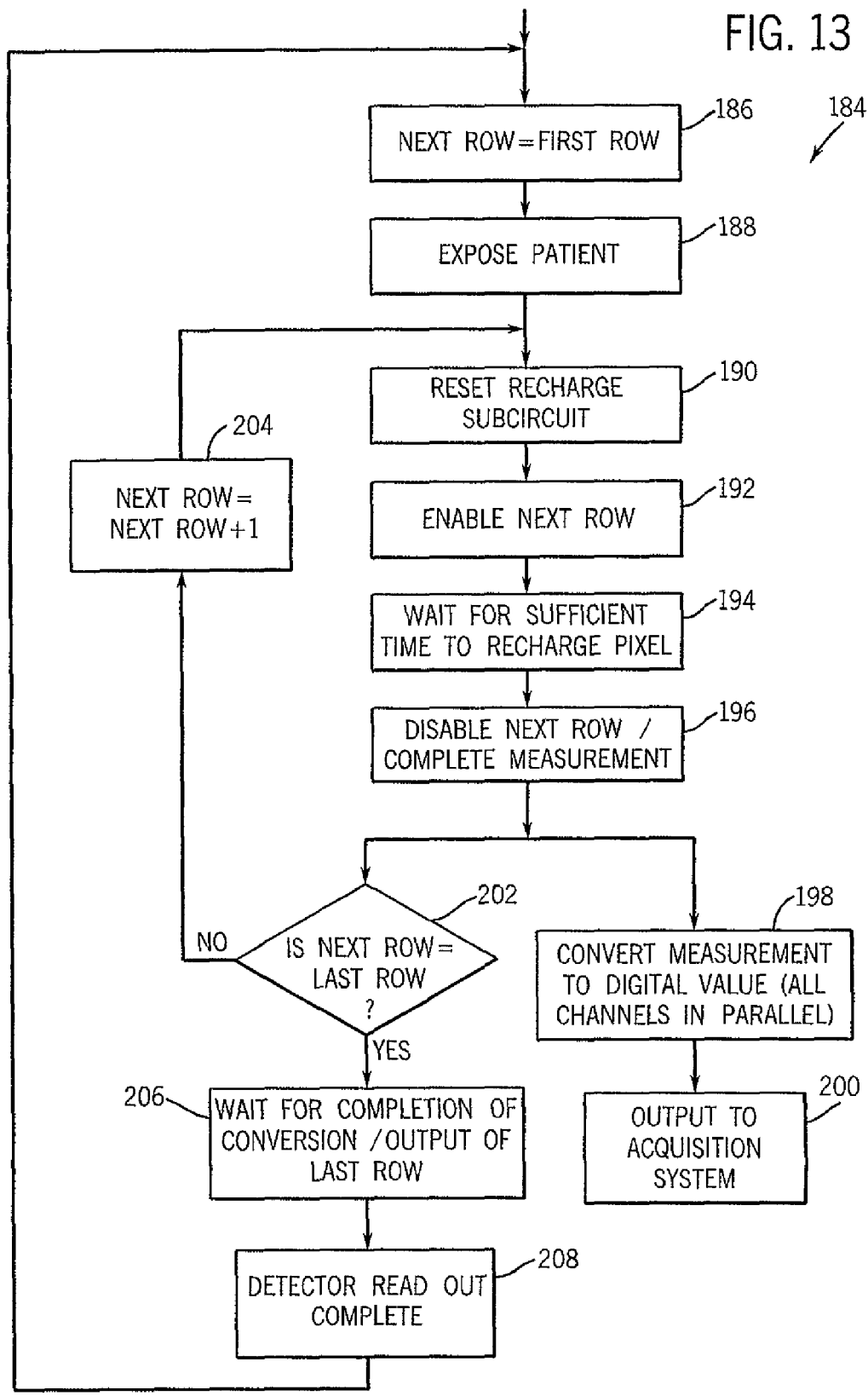
FIG. 13 is a flow chart illustrating in somewhat greater detail specific stages in performing the present technique in accordance with a present implementation.

FIG. 13 illustrates stages in carrying out the process, similar to that described above, in a present implementation. In the implemented process, indicated generally by reference numeral 184 in FIG. 13, code for controlling the scanning, converting and transferring functions begins at a step 186 in which a row variable, called "next row" in the example, is set to an initial value called "first row." At step 188 the exposure is made as described above. It should be noted that various types of exposure may be made, including pulsed and continuous exposures.

With the exposure made, and the detector having been altered by the radiation incident thereon during the exposure, a recharge sub-circuit is reset as indicated at step 190. Subsequently, the row currently designated as the "next row" is enabled for readout as indicated at step 192. A waiting period is then initiated as indicated at step 194, and a sufficient time is allowed to pass for complete recharge of the pixels of the row. Following this waiting period, the "next row" is disabled and measurement is completed as shown at step 196.

Following step 196, the simultaneous operations described above take place through the remainder of the process. That is, as shown at step 198, the measured data for the "next row" resulting from step 196 is converted to digital values. It should be noted that this conversion is performed for all channels of the readout electronics in parallel. Following the conversion, the data is output to the acquisition system at step 200, in a manner described above.

While the conversion and transfer operations are being accomplished, the readout continues as indicated at step 202 in FIG. 13. In particular, the control code determines whether the "next row" is the "last row" of the detector to be scanned. If the last desired scanned row is not the current value of "next row" the process reverts to step 204 at which the value of "next row" is indexed. With the indexed value of the variable "new row" then, control reverts to step 190 for recharging of the pixels of the row, measurement, conversion and transfer. Once the last row to be scanned is recharged, causing the result at step 202 to be affirmative, the process proceeds to step 206 at which the controller awaits completion of the conversion and output of the last row recharged. At step 208 the readout is indicated as complete, and control may revert to step 186 for the next examination.

It should be noted that a technique for supporting higher frame rates on large detectors with small pixels is to expose and read only part of the detector. Thus, fewer rows are scanned and less data is transferred. In digital diagnostic imaging departments, this requires less storage capacity and less network bandwidth than would the network transfer and storage of an image representing the full size of the detector. A balance must be struck between acceptable field of view versus acceptable frame rate. Thus, processing of a smaller the field of view increases the frame acquisition rate. Additional time may be saved if the longest processing function of each row is that of transferring data, and fewer pixels for each row are transferred as a result of the selection of a smaller field of view rather than measurement or conversion of signals provided by the detector. However, it should be further noted that other tradeoffs in measurements and conversion may be possible even when data transfer is not the most time consuming of the three functions that the readout electronics perform.

Additionally, in a present embodiment, the drive electronics of the detector are implemented as a shift register with a high voltage output in conjunction with a separate input. As an example, during normal operation, a single bit is shifted into the shift register. At the time it is desired to read the first row of pixels, an input signal is activated and the output of the drive electronics associated with the first row is placed in an "ON" state. Subsequently, the transistor within the each pixel conducts and the restore subcircuit provides the charge necessary to fully restore the photodiodes of the pixels on the first row. After sufficient time to charge the diodes has elapsed, the activated input signal is taken to its inactive state, causing the output to return to an "OFF" state, and the pixel transistors become non-conducting. In preparation for driving the second row, the shift register is clocked and the internal bit is advanced from the first position to the second. As the first bit is shifted, the sequence for driving the successive rows would be: enable, disable, shift, enable, disable, shift, enable, and disable, and so forth.

In an alternative technique, the detector is provided a function to allow scrubbing to prevent the characteristics of the individual pixels from degrading over time. In the case of a pulsed exposure as described previously, rows of pixels that are not being scanned as part of the reduced field of view can be scrubbed during the exposure at which time the field of view is not being read. More than one row can be scrubbed at a time. In instances of continuous exposure, a small amount of time during every image read out is provided for scrubbing as mentioned above, so that rows outside the field of view may be scrubbed. Another alternative implementation allows scrubbing and reading out more than one row at a time. Furthermore, the time for each row can be minimized by transferring only the data that is part of the field of view. Therefore, restricting the field of view saves readout time in two ways: firstly, by reducing the number of rows that need to be read out, and secondly, by reducing the number of data channels of data that need to be transferred in each row It should be noted again that other tradeoffs between measurement and conversion may be possible.

When a restricted field of view is defined along the edge of the detector (as opposed to the center), another advantage of the invention that is gained is that of improved angulation in positioning the patient relative to the detector. Defining a restricted field of view along the edge of the detector allows the detector to be positioned closer to the patient in procedures that require the detection of X-Rays produced at angles other than "normal" to the patient.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A detector for an imaging system comprising:
    an array of pixels forming rows and columns, and configured to generate signals based upon radiation impacting the detector; a plurality of scan lines and data lines, each one of the scan lines coupled to a respective row of pixels and each one of the data lines coupled to a respective column of pixels;
    a readout subcircuit for selectively coupling the rows of pixels to the respective scan lines and columns of pixels to the respective data lines for read out of the signals, the readout subcircuit recharging a charge on the rows of pixels discharged by the impact of the radiation, and measuring the charge required to restore the charge on a first row of pixels;and
    a convert subcircuit configured to convert the measurement on a first row of pixels, while a second row of pixels is simultaneously recharged; and
    an output subcircuit configured to transfer converted data to a data acquisition system, the converted data of the first row of pixels configured to be transferred concurrently as a third row of pixels is recharged and the measurement of the second row of pixels is converted.

2. The detector as in claim 1, wherein the measured data are stored in a data acquisition system.

3. The detector as in claim 2, wherein the measured data are utilized to generate an image.

4. The detector as in claim 1, wherein the detector is positioned in a computed tomography scanner.

5. The detector as in claim 1, wherein the detector is positioned in a magnetic imaging resonance system.

6. The detector as in claim 1, wherein the detector is positioned within an X-ray imaging system.

7. The detector as in claim 1, wherein the read out subcircuit is configured to readout data from a specific row of pixels and is configured to scrub a further specific row of pixels separately.

8. The detector as in claim 7, wherein the further row of pixels is scrubbed at a time corresponding to an exposure initiation time.

9. The detector as in claim 1, wherein the convert subcircuit is configured to convert analog signals to digital signals, the analog signals being received from the readout subcircuit.

10. The detector as in claim 9, wherein the convert subcircuit is configured to transmit the measured and converted signals from a series of data channels.

11. The detector as in claim 10, wherein the detector is adapted to provide scrubbing of the pixels on a periodic basis.

12. The detector as in claim 10, wherein the detector is adapted to scrub and readout multiple rows separately.

13. The detector as in claim 1, wherein the detector is operated by an operator control system.

14. The detector as in claim 1, wherein each of the pixels includes a thin film transistor and a photodiode.

15. A method for processing image data from a desired field of view of a digital detector comprising the steps of:
    generating signals based upon radiation impacting the detector, the detector having an array of pixels forming rows and columns;
    initiating readout of the detector via a plurality of scan lines and data lines, each one of the scan lines coupled to a respective row of pixels and each one of the data lines coupled to a respective column of pixels;
    recharging pixels of each row of pixels discharged by the impact of the radiation, and measuring the amount of charge required to restore the charge to each pixel;
    converting the recharge on a first row of pixels, and simultaneously charging a second row of pixels; and
    transferring a converted recharge data to a data acquisition system, the measured recharge data of the first row of pixels being transferred concurrently as a third row of pixels is recharged and recharge of the second row of pixels is converted.

16. The method as in claim 15, wherein the measured recharge data is stored in a data acquisition system.

17. The method as in claim 16, wherein the measured recharge data is utilized to generate an image.

18. The method as in claim 15, wherein the detector is positioned in a computed tomography scanner.

19. The method as in claim 15, wherein the detector is positioned in a magnetic imaging resonance system.

20. The method as in claim 15, wherein the detector is positioned within an X-ray imaging system.

21. The method as in claim 15, comprising measuring recharge of a specific row of pixels and scrubbing a further row of pixels separately.

22. The method as in claim 21, where in the further row of pixels is scrubbed at a time corresponding to an exposure initiation time.

23. The method as in claim 15, further comprising converting analog signals to digital signals, the analog signals being generated during the recharging and measuring step.

24. The method as in claim 23, further comprising transferring the measured and converted signals from a series of data channels.

25. The method as in claim 15, further comprising scrubbing the rows of pixels on a periodic basis.

26. The method as in claim 15, further comprising scrubbing or reading out multiple rows of pixels simultaneously.

27. The method as in claim 15, comprising controlling the detector via an operator control system.

28. The method as in claim 15, wherein recharging and measuring recharge are performed via a thin film transistor and a photodiode for each pixel.

29. A system for processing image data from a desired field of view of a digital detector comprising:
    means for generating signals based upon radiation impacting the detector, the detector having an array of pixels forming rows and columns;
    means for initiating the readout of the detector via a plurality of scan lines and data lines, each one of the scan lines coupled to a respective row of pixels and each one of the data lines coupled to a respective column of pixels;
    means for recharging pixels of each rows discharged by the impact of the radiation, and for measuring the amount of charge required to restore the charge to each pixel;
    means for converting the measurement on a first row of pixels, and simultaneously recharging a second row of pixels; and
    means for transferring converted data to a data acquisition system, the measured data of the first row of pixels being transferred concurrently as pixels of a third row of pixels are recharged and the measurement of pixels of a second row of pixels is converted.

30. The system as in claim 29, wherein the measured data is stored in a data acquisition system.

31. The system as in claim 29, wherein the measured data is utilized to generate an image.

32. The system as in claim 29, wherein the system is a computed tomography scanner.

33. The system as in claim 29, wherein the system is a magnetic imaging resonance system.

34. The system as in claim 29, wherein the system is an X-ray imaging system.

35. The system as in claim 29, wherein the means for measuring is configured to measure recharge of a specific row of pixels and the means for recharging is configured to scrub a further specific row of pixels separately.

36. The system as in claim 35, wherein the further specific row of pixels is scrubbed at a time corresponding to an exposure initiation time.

37. The system as in claim 29, further comprising means for converting analog signals to digital signals, the analog signals being received from measurement of recharge of pixels.

38. The system as in claim 37, comprising means for transmitting the measured and converted signals from a series of data channels.

39. The system as in claim 29, comprising means for scrubbing the rows of pixels on a periodic basis.

40. The system as in claim 29, further comprising means for scrubbing and measuring recharge of multiple rows of pixels separately.

41. The system as in claim 29, wherein the detector is operated by an operator control system.

42. The system as in claim 29, wherein each of the pixels includes a thin film transistor and a photodiode.

43. A computer program for generating an image and increasing an image acquisition rate of detector comprising:
    a tangible medium configured to support machine-readable code; and
    machine readable code supported on the medium and including:
    a routine for generating signals based upon radiation impacting a detector, the detector having an array of pixels forming rows and columns;
    a routine for initiating the readout of the detector, via a plurality of scan lines and data lines, each one of the scan lines coupled to a respective row of pixels and each one of the data lines coupled to a respective column of pixels;
    a routine for recharging pixels of each row discharged by the impact of the radiation, measuring the amount of charge required to restore the charge to each pixel;
    a routine for converting the measurement on a first row of pixels, and simultaneously charging a second row of pixels; and
    a routine for transferring the converted measurement data to a data acquisition system, the converted measurement data of the first row of pixels configured to be transferred concurrently as a third row of pixels is charged and the second row of pixels is converted.

44. The tangible medium as in claim 43, comprising a routine for storing the converted data stored in a data acquisition system.

45. The tangible medium as in claim 44, comprising a routine for generating an image using the converted data.

46. The tangible medium as in claim 43, further comprising a routine to provide scrubbing of the pixels on a periodic basis.

47. The tangible medium as in claim 43, further comprising a routine to scrub and readout multiple rows separately.

48. The tangible medium as in claim 43, further comprises a routine to transmit the measured and converted data from a series of data channels.

49. A method for improving processing of image data from a digital detector comprising the steps of:
    generating signals based upon radiation impacting the detector in a desired field of view smaller than a full field of view of the detector, the detector having an array of pixels forming rows and columns;
    initiating readout of the detector via a plurality of scan lines and data lines, each one of the scan lines coupled to a respective row of pixels and each one of the data lines coupled to a respective column of pixels;
    recharging pixels of each row of pixels discharged by the impact of the radiation, and measuring the amount of charge required to restore the charge to each pixel;
    converting the recharge on a first row of pixels, and simultaneously charging a second row of pixels;
    transferring a converted recharge data to a data acquisition system, the measured recharge data of the first row of pixels being transferred concurrently as a third row of pixels is recharged and recharge of the second row of pixels is converted; and
    storing the transferred data in a memory, wherein the data occupies less memory than comparable data for the full field of view.

50. The method as in claim 49, wherein the transferred data requires less transmission bandwidth than comparable data for the full field of view.

51. The method as in claim 49, wherein the measured recharge data is utilized to generate an image.

52. The method as in claim 49, wherein the detector is positioned in a computed tomography scanner.

53. The method as in claim 49, wherein the detector is positioned in a magnetic imaging resonance system.

54. The method as in claim 49, wherein the detector is positioned within an X-ray imaging system.

55. The method as in claim 49, comprising measuring recharge of a specific row of pixels and scrubbing a further row of pixels separately.

56. The method as in claim 55, where in the further row of pixels is scrubbed at a time corresponding to an exposure initiation time.

57. The method as in claim 49, further comprising converting analog signals to digital signals, the analog signals being generated during the recharging and measuring step.

58. The method as in claim 57, further comprising transferring the measured and converted signals from a series of data channels.

59. The method as in claim 49, further comprising scrubbing the rows of pixels on a periodic basis.

60. The method as in claim 49, further comprising scrubbing or reading out multiple rows of pixels simultaneously.

61. A system for improving processing of image data from a digital detector comprising:
  means for generating signals based upon radiation impacting the detector in a desired field of view smaller than a full field of view of the detector, the detector having an array of pixels forming rows and columns;
  means for initiating the readout of the detector via a plurality of scan lines and data lines, each one of the scan lines coupled to a respective row of pixels and each one of the data lines coupled to a respective column of pixels;
  means for recharging pixels of each row, the pixels being discharged by the impact of the radiation, and for measuring the amount of charge required to restore the charge to each pixel;
  means for converting the measurement on a first row of pixels, and simultaneously recharging a second row of pixels;
  means for transferring converted data to a data acquisition system, the measured data of the first row of pixels being transferred concurrently as pixels of a third row of pixels are recharged and the measurement of pixels of a second row of pixels is converted; and
  memory means for storing the transferred data, wherein the data occupies less memory than comparable data for the full field of view.

62. The system as in claim 61, wherein the transferred data requires less transmission bandwidth than comparable data for the full field of view.

63. The system as in claim 61, further comprising means for generating an image from the measured recharge data.

64. The system as in claim 61, wherein the detector is positioned in a computed tomography scanner.

65. The system as in claim 61, wherein the detector is positioned in a magnetic imaging resonance system.

66. The method as in claim 61, wherein the detector is positioned within an X-ray imaging system.

67. The method as in claim 61, wherein the means for recharging pixels measures recharge of a specific row of pixels and scrubs a further row of pixels separately.

68. The system as in claim 67, where in the further row of pixels is scrubbed at a time corresponding to an exposure initiation time.

69. The system as in claim 61, comprising means for converting analog signals to digital signals, the analog signals being generated during the recharging and measuring of pixels.

70. The system as in claim 61, wherein measured and converted signals are transferred from a series of data channels.

71. The system as in claim 61, wherein the means for recharging pixels scrubs rows of pixels on a periodic basis without measuring charge.

72. The system as in claim 61, wherein the means for recharging scrubs or reads out multiple rows of pixels simultaneously.

* * * * *